United States Patent
Park

(10) Patent No.: US 9,020,675 B2
(45) Date of Patent: Apr. 28, 2015

(54) HYBRID VEHICLE TRANSMISSION AND METHOD OF CONTROLLING STARTING OF HYBRID VEHICLE

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 13/761,581

(22) Filed: Feb. 7, 2013

(65) Prior Publication Data
US 2013/0282213 A1    Oct. 24, 2013

(30) Foreign Application Priority Data
Apr. 19, 2012    (KR) .................. 10-2012-0041080

(51) Int. Cl.
| | |
|---|---|
| *B60W 20/00* | (2006.01) |
| *B60W 10/115* | (2012.01) |
| *B60W 10/08* | (2006.01) |
| *F16H 37/08* | (2006.01) |
| *B60W 10/06* | (2006.01) |
| *B60K 6/365* | (2007.10) |
| *B60K 6/445* | (2007.10) |

(52) U.S. Cl.
CPC .............. *B60W 20/00* (2013.01); *B60W 10/06* (2013.01); *B60W 10/08* (2013.01); *B60W 10/115* (2013.01); *F16H 37/0806* (2013.01); *Y10S 903/93* (2013.01); *B60K 6/365* (2013.01); *B60K 6/445* (2013.01); *B60W 20/40* (2013.01); *B60W 20/20* (2013.01); *Y02T 10/6286* (2013.01); *Y02T 10/6239* (2013.01); *Y02T 10/76* (2013.01)

(58) Field of Classification Search
CPC ..... B60W 10/06; B60W 10/08; B60W 10/04; B60W 1/02; B60W 20/00; B60K 6/40; B60K 6/445; B60K 6/365; B60K 6/52; B60K 6/38; F16H 3/44; F16H 48/06
USPC ............. 701/22; 180/65.25, 65.265; 318/432; 475/5, 286; 477/100
See application file for complete search history.

(56) References Cited

U.S. PATENT DOCUMENTS

| | | | |
|---|---|---|---|
| 7,192,373 B2 * | 3/2007 | Bucknor et al. ................... 475/5 |
| 7,488,269 B2 * | 2/2009 | Tabata et al. ................... 475/286 |
| 7,881,834 B2 * | 2/2011 | Le Neindre et al. ............ 701/22 |
| 2006/0017414 A1 * | 1/2006 | Joe et al. ........................ 318/432 |
| 2006/0113129 A1 * | 6/2006 | Tabata .......................... 180/65.2 |

(Continued)

FOREIGN PATENT DOCUMENTS

| | | |
|---|---|---|
| JP | 2012101656 A | 5/2012 |
| KR | 10-2007-0049988 | 5/2007 |
| KR | 10-2012-0019855 | 3/2012 |

*Primary Examiner* — Tuan C. To
*Assistant Examiner* — Yuri Kan
(74) *Attorney, Agent, or Firm* — Mintz Levin Cohn Ferris Glovsky and Popeo, P.C.

(57) ABSTRACT

Disclosed herein is a vehicle transmission and a method of controlling the starting of the vehicle. The method includes: starting, by a controller, the engine by a starter; adjusting, by the controller, an input shaft speed of a transmission to a predetermined speed range to engage a coupling element of a torque transfer mechanism; and determining, by the controller, after the coupling element of the torque transfer mechanism is engaged, the input shaft speed of the transmission according to the engine speed and driving efficiency of at least two motor generators, in response to a request for engine power.

17 Claims, 5 Drawing Sheets

(56) References Cited

U.S. PATENT DOCUMENTS

| | | | |
|---|---|---|---|
| 2008/0093137 A1* | 4/2008 | Maeda et al. | 180/65.2 |
| 2009/0227409 A1* | 9/2009 | Ito et al. | 475/5 |
| 2011/0256974 A1* | 10/2011 | Okuwaki | 475/5 |
| 2012/0283067 A1* | 11/2012 | Roos et al. | 477/100 |

* cited by examiner

HYBRID VEHICLE TRANSMISSION AND METHOD OF CONTROLLING STARTING OF HYBRID VEHICLE

CROSS-REFERENCE TO RELATED APPLICATION

This application claims priority to and the benefit of Korean Patent Application No. 10-2012-0041080 filed in the Korean Intellectual Property Office on Apr. 19, 2012, the entire contents of which are incorporated herein by reference.

BACKGROUND OF THE INVENTION (a) Field of the Invention

The present invention relates to a transmission of a hybrid vehicle and a method of controlling the starting of the hybrid vehicle. More particularly, the present invention relates to a method of controlling the starting of the hybrid vehicle that improves starting responsiveness in the vehicle and a vehicle transmission that executes the method.

(b) Description of the Related Art

Typically, a hybrid vehicles include a generator that generates electric power from the rotation of an engine, and a battery (e.g., high pressure battery) applying power to a motor for providing a drive force. Generally, hybrid vehicles can be split into two types, a parallel hybrid vehicle and a series hybrid vehicle. In a parallel hybrid type, one or more electric motors and an internal combustion engine are installed so that they can both individually or together power the vehicle. Alternatively, in a series hybrid vehicle the vehicle travels by running a generator when the battery pack energy supplied to the motor is insufficient. Additionally, the hybrid vehicle may be a combination of parallel and series.

The hybrid vehicle connects a transmission to a motor and/or a motor and an engine. In a parallel hybrid, for example, the vehicle travels in an electric vehicle mode generally driven by only a motor at a starting position and a low speed travel, and as a vehicle speed increases, by enabling a transmission to operate in an electrically variable transmission (EVT) mode, the hybrid vehicle may travel in a power split mode that more efficiently uses power of the engine and the motor. The hybrid vehicle can use a fixed gear ratio, like in an existing transmission, to improve the power performance of the vehicle. A system based on such concept improves an idle stop function, maximization of regenerative braking, and fuel consumption and a power performance of a vehicle.

Further, the hybrid vehicle may be considered an environmentally friendly vehicle improving fuel consumption and reducing exhaust gas because when the hybrid vehicle is driven by only a motor generator, the engine does not generate an exhaust gas and may be driven at an optimal fuel consumption point.

Since a transmission of such a hybrid vehicle can embody various operation modes with a simple configuration and can change an operation mode thereof according to a traveling situation of the vehicle, a traveling performance of the vehicle may be improved, such as improvement of fuel consumption of the vehicle and improvement of an acceleration performance with efficient driving. However, due to frequent changes in the driving mode, improvement in responsiveness of engine starting may be difficult.

The above information disclosed in this Background section is only for enhancement of understanding of the background of the invention and therefore it may contain information that does not form the prior art that is already known in this country to a person of ordinary skill in the art.

SUMMARY

The present invention provides a transmission configuration and method of controlling the starting of a hybrid vehicle having advantages of improving responsiveness of engine starting according to various traveling modes of a hybrid vehicle and thus improving efficiency of vehicle driving. More specifically, present invention further provides a transmission of a hybrid vehicle having advantages of improving responsiveness of engine starting and improving driving efficiency by controlling engine speed when a hybrid vehicle is driven in a power split mode.

The technical objects of the present invention are not limited to the above-described technical objects and the other technical objects will be understood by those skilled in the art from the following description.

An exemplary embodiment of the present invention provides a transmission of a hybrid vehicle including: a first differential gear device connected to an ENGINE including a first member, a second member, and a third member; a first torque transfer mechanism configured to connect the ENGINE and the first member of the first differential gear device; a second differential gear device including a first member, a second member, and a third member, wherein the third member of the first differential gear device is continually connected to the third member of the second differential gear device, and the second member of the second differential gear device is connected to an output; a first motor generator (MG1) connected to a first member of the first differential gear device; a second motor generator (MG2) connected to the third member of the second differential gear device; a second torque transfer mechanism configured to connect the second member of the first differential gear device and the first member of the first differential gear device; a third torque transfer mechanism configured to connect the second member of the first differential gear device and a first member of the second differential gear device; a fourth torque transfer mechanism configured to connect to the first member of the first differential gear device to restrict a rotation of the first member of the first differential gear device; and a fifth torque transfer mechanism configured to connect to the first member of the second differential gear device to restrict a rotation of the first member of the second differential gear device. A speed of the second member of the first differential gear device may be reduced to a speed within a first speed range for a predetermined period before the ENGINE is started.

The predetermined period may be a period at which the ENGINE is started by a STARTER. The first speed range may be determined to be a speed range faster than a rotation speed of the ENGINE within speed constraints of the MG1 and the MG2. The first speed range may be a range greater than the ENGINE speed and smaller than the speed constraints of the MG1 and the MG2. The predetermined period may be a conversion period advancing from a low speed traveling period of an electric vehicle mode of the hybrid vehicle to a high speed traveling period of a power split mode after the ENGINE is started. The speed of the first member may be determined through a speed control of the MG1.

The first differential gear device and the second differential gear device may each be formed with a planetary gear system, the first member, the second member, and the third member of the first differential gear device may be formed with a first ring gear, a first carrier, and a first sun gear, respectively, and the first member, the second member, and the third member of the second differential gear device may be formed with a second ring gear, a second carrier, and a second sun gear, respectively.

The first torque transfer mechanism, the second torque transfer mechanism, and the third torque transfer mechanism may be formed with an engine clutch (EC), a first clutch, and a second clutch, respectively configured to connect or intercept members rotating at a relative rotation speed. The fourth torque transfer mechanism and the fifth torque transfer mechanism may be formed with a first brake and a second brake, respectively, to restrict a rotation of a connected member.

Another embodiment of the present invention provides a method of controlling starting of a hybrid vehicle including: disengaging, by a controller, when power of the ENGINE is not requested, a coupling element of a torque transfer mechanism and determining a speed of an input shaft of a transmission according to driving efficiency of at least two motor generators; and starting, by the controller, when power of the ENGINE is requested, the ENGINE by a STARTER, adjusting, by the controller, the input shaft speed of the transmission to a predetermined speed range to engage a coupling element of the torque transfer mechanism, and determining, by the controller, after the coupling element of the torque transfer mechanism is engaged, the input shaft speed of the transmission according to the ENGINE speed and driving efficiency of the at least two motor generators. The method may further include transferring, by the controller, input information to the hybrid vehicle transmission and inquiring whether power of the ENGINE is necessary.

The input information of the hybrid vehicle transmission may include starting request information of the ENGINE, a speed of an OUTPUT of the transmission, a request torque amount of each constituent element, each temperature of the MG1 and the MG2, a speed of the MG1, a speed of the MG2, a speed of the ENGINE, a state of charge (SOC) of the BATTERY, and information about engagement of an EC. The predetermined speed range may be a range between a speed constraint of the ENGINE and a speed constraint of each motor generator of the transmission.

The method may further include shortening, by the controller, a starting response time of the ENGINE by controlling the speed of the input shaft of the transmission that is adjusted to the predetermined speed range to a speed substantially equal to a maximum speed of the ENGINE.

The method may further include determining, by the controller, when the ENGINE power is requested, whether the input shaft speed of the transmission is adjusted to the predetermined speed range and whether a coupling element of the torque transfer mechanism is engaged.

According to the present invention, responsiveness of ENGINE starting may be improved according to various traveling modes of a hybrid vehicle and thus efficiency of vehicle driving may be improved. Further, by providing a transmission of a hybrid vehicle to which a method of controlling starting according to the present invention is applied, particularly, when the hybrid vehicle is driven in a power split mode, power of the hybrid vehicle may be reduced.

Figure 1:
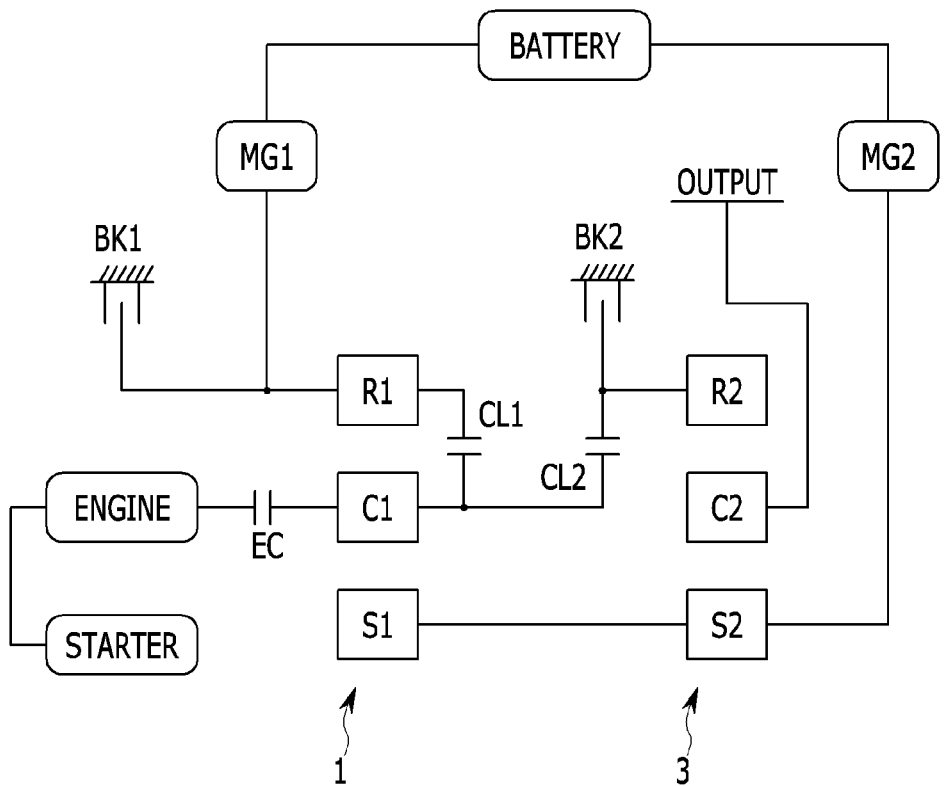
FIG. 1 is an exemplary diagram illustrating a configuration of a hybrid vehicle transmission according to an exemplary embodiment of the present invention.

| Description of symbols | |
|---|---|
| 1: first differential gear device | 3: second differential gear device |
| ENGINE: ENGINE | |
| OUTPUT: OUTPUT | |
| MG1: first motor-generator | MG2: second motor-generator |
| S1: first sun gear | C1: first carrier |
| R1: first ring gear | S2: second sun gear |
| C2: second carrier | R2: second ring gear |
| CL1: first clutch | CL2: second clutch |
| BK1: first brake | BK2: second brake |
| EC: engine clutch | |
| BATTERY: BATTERY | |
| STARTER: STARTER | |

DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, like reference numerals designate like elements in several exemplary embodiments and are representatively described in the first exemplary embodiment and elements different from those of the first exemplary embodiment will be described in other exemplary embodiments. The drawings and description are to be regarded as illustrative in nature and not restrictive. Like reference numerals designate like elements throughout the specification.

Throughout this specification and the accompanying claims, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is an exemplary diagram illustrating a configuration of a hybrid vehicle transmission according to an exemplary embodiment of the present invention.

Referring to FIG. 1, the transmission of the hybrid vehicle may include a first differential gear device 1 connected to an ENGINE; a second differential gear device 3 connected to the first differential gear device 1 at one side and connected to an OUTPUT connected to a driving device of the vehicle at the other side; the OUTPUT, a first motor generator (MG1), a second motor generator (MG2), and a plurality of torque transfer mechanisms are connected between each constituent element to transfer power.

Furthermore, the ENGINE is connected to the STARTER, and when a request command to start the ENGINE is input through a separate logic, the ENGINE may be started through the STARTER.

The ENGINE is selectively connected to one member (hereinafter, referred to as a 'second member') of the first differential gear device 1 through a torque transfer mechanism (hereinafter, referred to as a 'first torque transfer mechanism'). Furthermore, the second member may be an input shaft of the transmission of the hybrid vehicle.

The first differential gear device 1 may be continually connected to a member (hereinafter, referred to as a 'third member') of the second differential gear device 3 through the second member of the first differential gear device and another member (hereinafter, referred to as a 'third member') of the first differential gear device. The second differential gear device 3 may be connected to the OUTPUT through the third member of the second differential gear device and another member (hereinafter, referred to as a 'second member') of the second differential gear device.

The hybrid vehicle transmission may include a first motor generator (MG1) that may be continually connected to a member (hereinafter, referred to as a 'first member') of the first differential gear device 1 and a second motor generator (MG2) that may be continually connected to the third member of the second differential gear device 3. The MG1 and the MG2 may both be electrically connected to a BATTERY.

Further, the transmission according to an exemplary embodiment of the present invention may include a second torque transfer mechanism that may connect the second member of the first differential gear device 1 selectively connected to the ENGINE and the first member of the first differential gear device 1 mechanically connected to the MG1 and a third torque transfer mechanism that may connect the second member of the first differential gear device 1 and the remaining member (hereinafter, referred to as a 'first member') of the second differential gear device 3.

To restrict a rotation of the first member of the first differential gear device 1 connected to the second torque transfer mechanism, a fourth torque transfer mechanism may be installed. Further, to restrict a rotation of the first member of the second differential gear device 3 connected to the third torque transfer mechanism, a fifth torque transfer mechanism may be installed.

The first differential gear device 1 may include a first member, a second member, and a third member, and the second differential gear device 3 may include a first member, a second member, and a third member. The first differential gear device 1 and the second differential gear device 3 may each be formed with a planetary gear system.

Additionally, the first member, the second member, and the third member of the first differential gear device 1 may be formed with a first ring gear R1, a first carrier C1, and a first sun gear S1, respectively, and the first member, the second member, and the third member of the second differential gear device 3 may be formed with a second ring gear R2, a second carrier C2, and a second sun gear S2, respectively.

The first differential gear device 1 and the second differential gear device 3 may be embodied as another gear device that enables a rotation speed of one gear to be a weighted average velocity of the other two gears using gears such as a bevel gear and the planetary gear system.

Moreover, the first torque transfer mechanism connecting the ENGINE and the first carrier C1 of the first differential gear device 1 may be formed with an engine clutch (EC) to selectively connect or intercept two members rotating with a relative rotation speed. The second torque transfer mechanism that may selectively connect the first carrier C1 and the first ring gear R1 of the first differential gear device 1 may be formed with a first clutch CL1 to selectively connect or intercept two members rotating with a relative rotation speed.

To restrict a rotation of the first ring gear R1 connected to the MG1, the fourth torque transfer mechanism may be connected to the first ring gear R1. The fourth torque transfer mechanism may be formed with a first brake BK1.

Further, the third torque transfer mechanism that may selectively connect the first carrier C1 of the first differential gear device 1 and the second ring gear R2 of the second differential gear device 3 may be formed with a second clutch CL2 to connect or intercept two members rotating with a relative rotation speed. The fifth torque transfer mechanism provided to restrict a rotation of the second ring gear R2 may be formed with a second brake BK2.

In the transmission of the hybrid vehicle according to an exemplary embodiment of FIG. 1, the ENGINE may be connected to the first carrier C1 via an engine clutch EC, the first carrier C1 may be connected to the second ring gear R2 via the second clutch CL2, and the second carrier C2 of the second differential gear device 3 may be connected to the OUTPUT.

Figure 2:
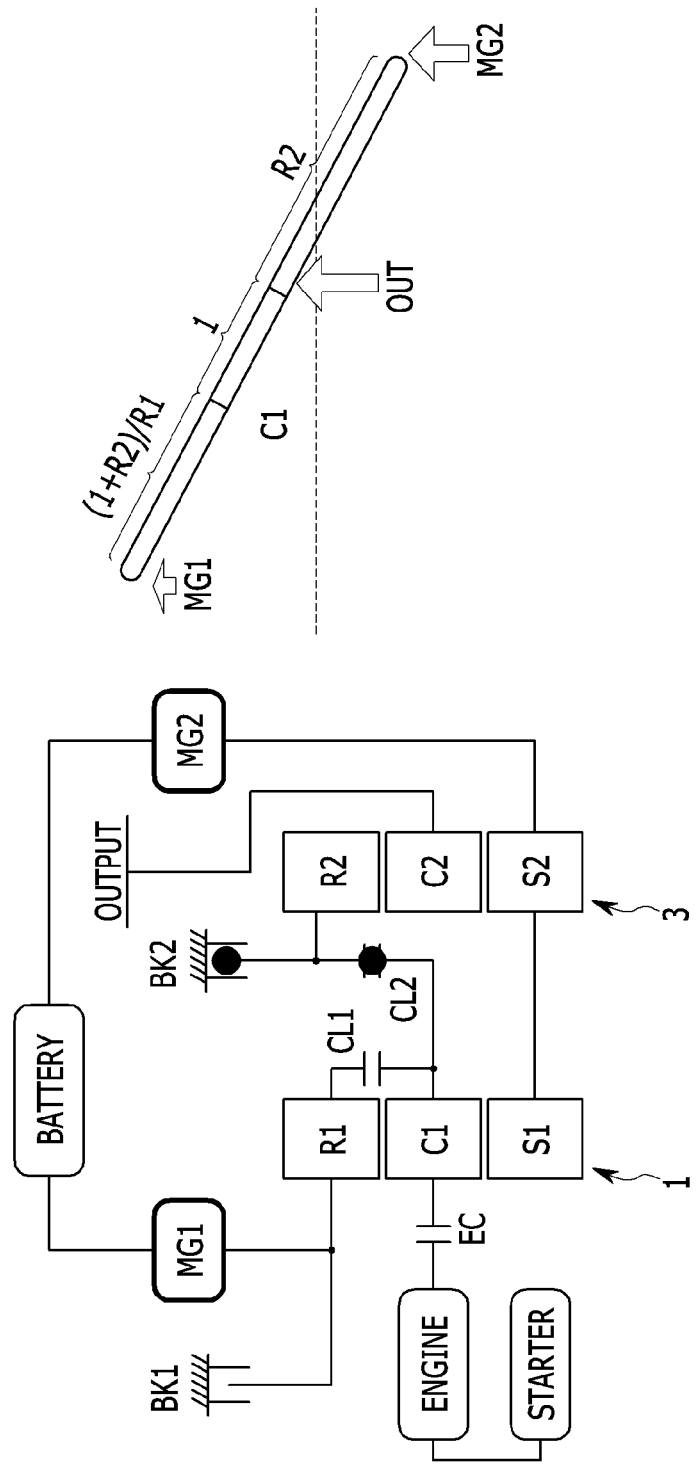
FIGS. 2 to 4 are exemplary lever diagrams illustrating a driving state of a hybrid vehicle transmission on a driving mode step basis according to an exemplary embodiment of the present invention.
Figure 3:
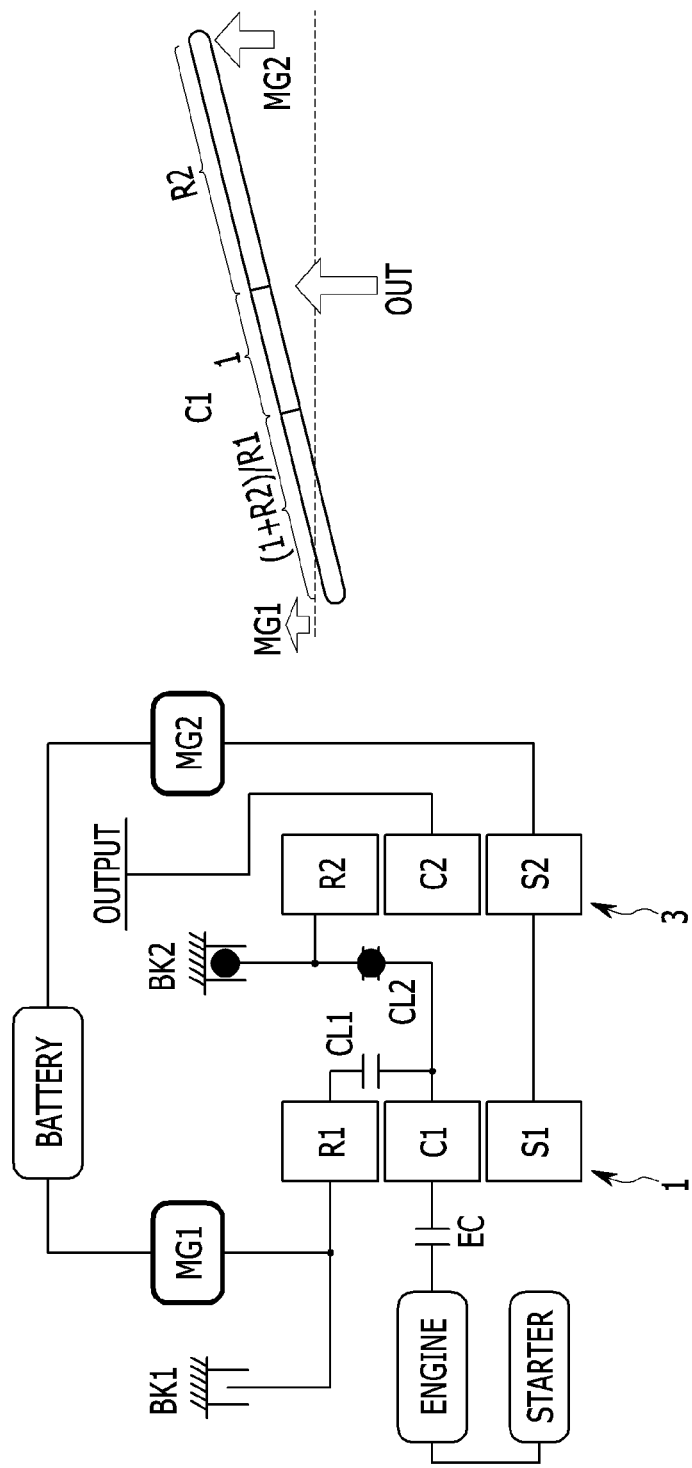
Figure 4:
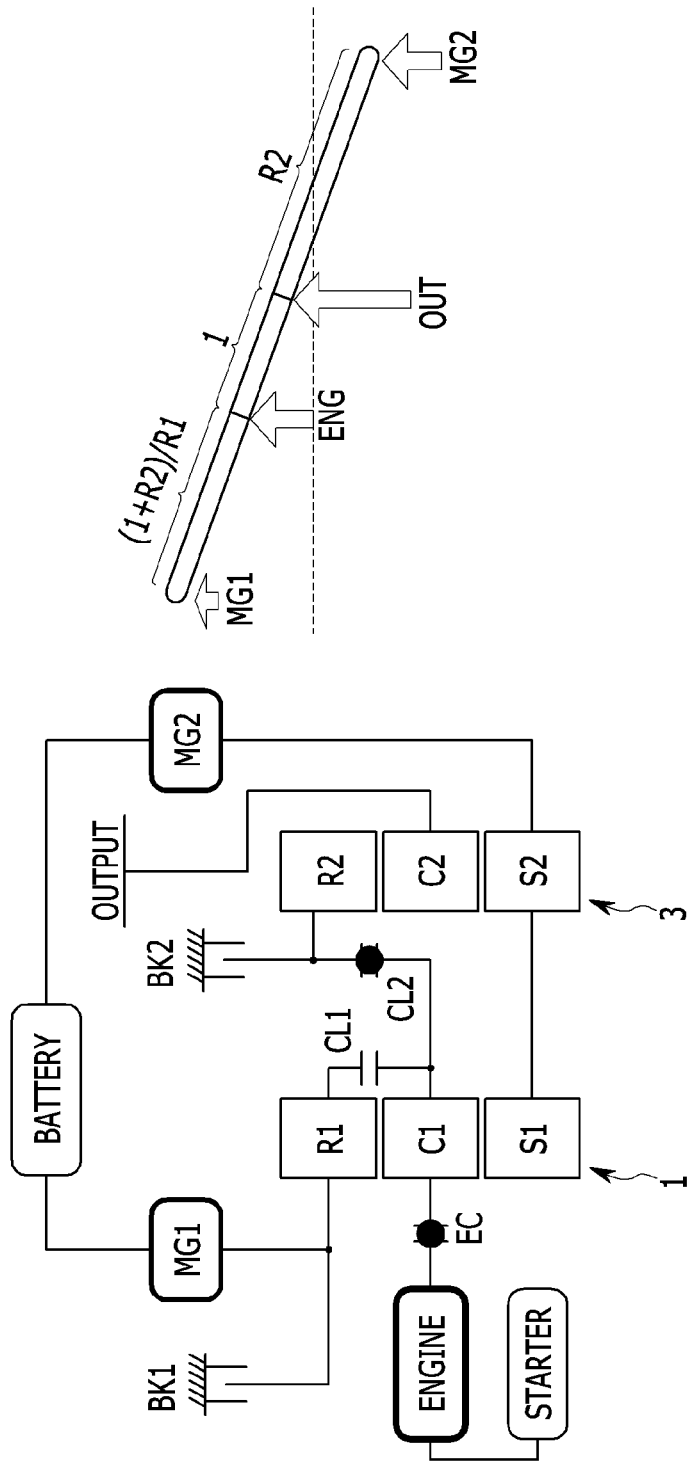

FIGS. 2 to 4 are exemplary lever diagrams illustrating a driving state of a hybrid vehicle transmission on a driving mode step basis according to an exemplary embodiment of the present invention.

In general, an operation mode state of the hybrid vehicle may be embodied with various speed change modes according to the coupling of a brake and a clutch, which may be a torque transfer mechanism. Driving modes of a vehicle may be classified into electric vehicle mode 1 (EV1) and electric vehicle mode 2 (EV2) modes, an input split mode and a compound split mode (e.g., power split modes), and three fixed gear modes. Particularly, the EV1 and EV2 modes, may be a stop mode EV1 and a low speed traveling mode EV2 of a state in which a connection of the EC is disengaged.

When high driving power is necessary during high vehicle traveling speed traveling or when ENGINE starting is necessary, as a BATTERY is consumed, the vehicle may use ENGINE power to travel when the EC is coupled by ENGINE starting. After the ENGINE is started by the STARTER, the ENGINE may control a speed to synchronize with a carrier connected to a differential gear device, and the EC may be coupled, and upon compound split driving of a power split mode, a target speed (e.g., carrier rotation speed) of the ENGINE may be above a predetermined threshold and thus an excessive time may be consumed when synchronizing the speed.

A transmission using a method of controlling starting of a hybrid vehicle according to an exemplary embodiment of the present invention may use the freedom degree of speed determination of a carrier of a differential gear device according to a driving mode of FIGS. 2 to 4, thereby improving responsiveness of ENGINE starting of the vehicle. Additionally, the present invention provides a technology that may control a speed of the carrier to a speed in which coupling of the EC is advantageous upon starting the ENGINE. Therefore, due to responsiveness of entire ENGINE starting being substantially fast, an ENGINE starting time may decrease.

FIGS. 2 to 4 are exemplary lever diagrams illustrating a driving state of a hybrid vehicle transmission with a connection operation of each constituent element in a particular driving mode among various driving modes according to an exemplary embodiment of the present invention. In particular, FIG. 2 illustrates an exemplary lever diagram between a connection operation of a constituent element of a transmission of a low speed traveling EV2 state of an electric vehicle mode and constituent elements. FIG. 3 illustrates an exemplary transmission structure and a lever diagram in an ENGINE starting control mode before the ENGINE is started, and FIG. 4 illustrates an exemplary transmission structure and a lever diagram upon driving in a compound split mode of a power split mode after the ENGINE is coupled.

In the present invention, the exemplary lever diagrams illustrate a relative relationship of a speed and a torque between constituent elements of the vehicle transmission. A vertical relationship of each lever diagram corresponds to a magnitude of a speed, and a length of an arrow in each diagram corresponds to a magnitude of a force (e.g., torque) applied to rotate a corresponding constituent element. In other words, a horizontal axis (indicated by a dotted line on the diagram) in each lever diagram is a base line at which point a speed becomes zero 0, and as the position on the lever moves above the base line, a speed of one direction of a corresponding constituent element may increase.

Further, as a length of the arrow in each diagram increases, a torque amount applied to a corresponding constituent element may increase and thus, as shown in FIGS. 2 to 4, a torque amount of the OUTPUT is may be the largest of the constituent elements (e.g., the ENGINE, MG1, MG2 and the OUTPUT).

Referring to FIGS. 2 to 4, a torque amount of the OUTPUT may be balanced by the sum of the torque amounts of the constituent elements. In other words, in FIGS. 2 and 3, the sum of torque amounts of the MG1 and the MG2 is substantially equal to a torque amount of the OUTPUT. Further, in FIG. 4, the sum of torque amounts of the MG1, the MG2, and the ENGINE substantially corresponds to a torque amount of the OUTPUT.

A force (e.g., torque) output from the OUTPUT may be balanced with a force of both motor generators (MG1 and MG2) or the ENGINE according to a driving mode, and the OUTPUT may be connected to the driving device of the vehicle to drive the vehicle. Due to the connection of the OUTPUT to the vehicle driving device, the force output from the OUTPUT may be a vehicle speed, and a rotation speed of the OUTPUT may be a vehicle speed and may be maintained at a substantially fixed speed.

Hereinafter, a method of controlling the starting on a driving mode basis of FIGS. 2 to 4 according to an exemplary embodiment of the present invention will be described.

FIG. 2 illustrates a low speed traveling EV2 state of an electric vehicle mode, in which an EC is disengaged, and by engaging the second clutch CL2 together with the second brake BK2, the ENGINE may be actively fixed. In FIG. 2, an engaging state may be represented by a solid circle. Therefore, as shown in a torque relationship of the lever diagram of FIG. 2, power transferred to the OUTPUT connected to the vehicle driving device may be balanced with power of the MG1 and the MG2. In other words, in a low speed traveling EV2 state of an electric vehicle mode, the vehicle may be driven by only power of the MG2 and the MG1 instead of power of the ENGINE.

Furthermore, a speed of the first carrier C1 of the first differential gear device 1 connected to the ENGINE may be determined when driving efficiency of the MG2 and the MG1 is sufficient and when an emitted heat amount is substantially minimal. In other words, driving efficiency of the MG2 and the MG1, represented with a thick line in FIG. 2, may become a variable affecting a speed of the first carrier C1.

As shown in the lever diagram of FIG. 2, since a speed of the first carrier C1 may be considerably high, when an ENGINE starting mode is engaged, a substantial amount of time is consumed to synchronize an ENGINE target speed with a speed of the first carrier C1.

Therefore, as shown in FIG. 3, in an ENGINE starting control mode, a speed of the first carrier C1 is controlled to be relatively low. FIG. 3 illustrates an exemplary ENGINE starting control state and a state in which the ENGINE may be started by the STARTER. In other words, when the ENGINE is started by the STARTER, the ENGINE speed must be synchronized with the speed of the first carrier C1, and synchronization may not be performed by only speed control of an existing ENGINE.

Furthermore, a speed change of the first carrier C1 may be performed by a speed change of the MG1. Since the OUTPUT is connected to a vehicle driving device, a driving torque of the OUTPUT of FIG. 3 may maintain a substantially fixed speed and a substantially constant torque amount, compared with an operation mode of FIG. 2. In such a state, a speed of the first carrier C1 may be determined to a lowest speed advantageous for synchronization through a speed control of the MG1. As a speed of the MG1 decreases, efficiency may be momentarily deteriorated in an ENGINE starting control mode, however due to improved responsiveness of ENGINE starting within a short time, efficiency in an entire driving mode of the hybrid vehicle may be increased.

A speed range of the first carrier C1 may not be limited to a predetermined level, but may be determined within a speed constraint of each of the MG1 and the MG2. A speed of the first carrier C1 may be determined to be substantially equal to an ENGINE speed. Thus reducing the time necessary to synchronize the ENGINE speed with the speed of the first carrier C1. In other words, a speed range of the first carrier C1 may be determined within a range of the ENGINE speed and speed constraint of the MG1 and the MG2.

FIG. 4 illustrates an exemplary lever diagram and a transmission connection structure in a compound split mode, which is one of power split modes and illustrates that power of the ENGINE may be used, after ENGINE starting of FIG. 3, as the EC is coupled.

FIG. 4 illustrates a high speed running state after the ENGINE is started, and such a high speed traveling mode may be used by engaging the second clutch CL2. In a compound split mode of FIG. 4, as represented by a solid circle, the EC and the second clutch CL2 may be engaged.

Therefore, by engaging the second clutch CL2, the first differential gear device 1 and the second differential gear device 3 may form one lever, as shown in the drawings. Additionally, the vehicle may be driving using the MG2 and the ENGINE and the MG1 may act as a power generator or a power circulator.

Moreover, as shown in a lever diagram of FIG. 4, a driving torque of the OUTPUT may balanced with the sum of power of the MG1, the MG2, and the ENGINE. Additionally, as shown in FIG. 4, in the high speed traveling mode, the speed of the MG1 may increase. Furthermore, the speed of the first carrier C1 may be determined at a point when the state of charge (SOC) management of the BATTERY is advantageous.

Figure 5:
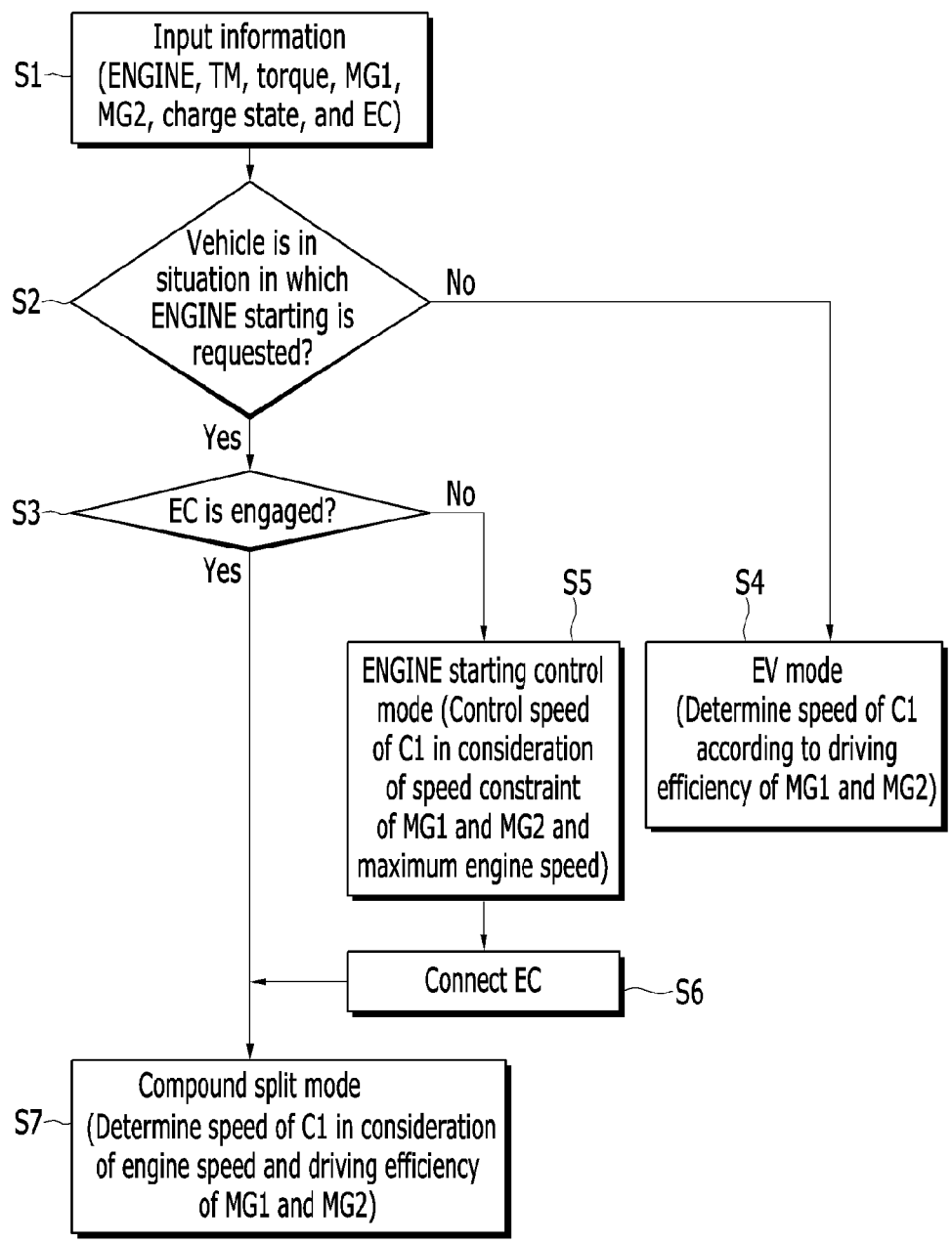
FIG. 5 is an exemplary flowchart illustrating a control flow of a hybrid vehicle transmission performed on a driving mode step basis of FIGS. 2 to 4, according to an exemplary embodiment of the present invention.

The efficiency of the vehicle system may be improved in the high speed traveling mode as shown in FIG. 4, since all driving efficiency conditions of the MG1, the MG2, and the ENGINE are considered. FIG. 5 is an exemplary flowchart illustrating a control flow of a hybrid vehicle transmission performed on a driving mode step basis of FIGS. 2 to 4. In other words, FIG. 5 illustrates a speed control of the first carrier C1 in each driving mode together with the control order on a driving mode basis of FIGS. 2 to 4.

Information input to a transmission of a hybrid vehicle according to an exemplary embodiment of the present invention may be information regarding the ENGINE, the transmission, the torque, the MG1, the MG2, a charge state, and the EC (S1). Specifically, information input to a hybrid vehicle transmission may be a request for information of the ENGINE starting, a speed of the OUTPUT of the transmission, a request torque amount of each constituent element, temperature of the MG1 and the MG2, a lowest speed of the MG1, a maximum speed of the MG2, a lowest speed of the ENGINE, an SOC of the BATTERY, and engagement information of the EC.

When transmission related information of the hybrid vehicle is input, ENGINE starting may be requested (S2). During an electric vehicle traveling mode according to a driving operation situation or a vehicle monitoring state through separate logic of a controller, when ENGINE starting is requested, the hybrid vehicle may generate and transfer an operation command. In other words, when high power is requested while the vehicle performs a driving operation, and high speed traveling is necessary, or when charge is requested, as a substantial amount of a BATTERY is consumed, the vehicle may output an ENGINE starting request command as a control command of the vehicle controller.

In an inquiry situation of step S2, when ENGINE starting is not requested, the process continues at step S4, and the vehicle may be driven in an electric vehicle traveling mode (EV). As described above, in the electric vehicle traveling mode, the vehicle may be in a stop state or a low speed running state, and when the vehicle is in the low speed running state, a speed of the first carrier C1 may be determined according to driving efficiency of the MG1 and the MG2. Specifically, a speed of the first carrier C1 at step S4 may be determined by a speed of the OUTPUT, a request torque amount, and each temperature of the MG1 and the MG2 among information input at step S1. When the driving efficiency of the MG1 and the MG2 increases, fuel consumption of the vehicle may be substantially improved. Additionally, Step S4 indicates a driving mode that is shown in FIG. 2.

In an inquiry situation of step S2, when ENGINE starting is requested, the process continues at step S3 and the inquiry may be whether the EC of the transmission of the hybrid vehicle is engaged (S3). When the EC is not engaged, due to the ENGINE not being connected to the first carrier C1 of the first differential gear device, the vehicle may be driven in an ENGINE starting control mode of step S5.

Moreover, as shown in step S5, the ENGINE may be started using the STARTER. Furthermore, according to a method of controlling the starting of the present invention, a speed of the first carrier C1 of the first differential gear device may be controlled to be relatively low to be advantageous to synchronize the speed of C1 with an ENGINE speed. Specifically, a speed of the first carrier C1 may be determined by considering an ENGINE speed and speed constraints of the MG1 and the MG2, as described above.

A speed constraint of the MG1 may be a function of a lowest speed of the MG1 and a speed of the OUTPUT among information input at the S1. A speed constraint of the MG2 may be a function of a maximum speed of the MG2 and a speed of the OUTPUT among information input at step S1.

In an ENGINE starting control mode of step S5, after the ENGINE is started, the EC may be engaged (S6), and the ENGINE may be connected to the first carrier C1 of the first differential gear device. Due to a decrease in the speed of the first carrier C1 to synchronize with an ENGINE speed through step S5, responsiveness of ENGINE starting may be improved.

Therefore, the vehicle may travel in a substantially high traveling speed in a compound split mode, which is a power split mode of step S7. A speed of the first carrier C1 in a compound split mode of step S7 may be determined by considering an ENGINE speed and driving efficiency of the MG1 and the MG2.

Further, some of constituent elements described in this specification may be omitted without degradation of a performance or may be added to improve a performance by a person of an ordinary skill in the art. Further, a person of ordinary skill in the art may change the order of steps of the claimed method described in the specification according to a process environment or equipment. Thus, a range of the present invention should be determined by claims and equivalents thereof, not a described exemplary embodiment.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle transmission, comprising:
a first differential gear device selectively connected to an engine including a first member, a second member, and a third member;
a first torque transfer mechanism configured to selectively connect the engine and the first member of the first differential gear device;
a second differential gear device including a first member, a second member, and a third member, wherein the third member of the first differential gear device is continually connected to the third member of the second differential gear device, and the second member of the second differential gear device is connected to an output;
a first motor generator (MG1) connected to a first member of the first differential gear device;
a second motor generator (MG2) connected to the third member of the second differential gear device;
a second torque transfer mechanism configured to connect the second member of the first differential gear device and the first member of the first differential gear device;
a third torque transfer mechanism configured to connect the second member of the first differential gear device and a first member of the second differential gear device;
a fourth torque transfer mechanism configured to connect to the first member of the first differential gear device to restrict a rotation of the first member of the first differential gear device; and
a fifth torque transfer mechanism configured to connect to the first member of the second differential gear device to restrict a rotation of the first member of the second differential gear device,
wherein a speed of the second member of the first differential gear device is reduced to a speed within a first speed range for a predetermined time period before the engine is started, and
the first speed range is greater than a rotation speed of the engine and smaller than speed constraints of the MG1 and the MG2.

2. The transmission of claim 1, wherein the predetermined time period is a period at which the engine is started by a starter.

3. The transmission of claim 1, wherein the predetermined time period is a conversion period advancing from a low speed traveling period of an electric vehicle mode of the vehicle to a high speed traveling period of a power split mode after the engine is started.

4. The transmission of claim 1, wherein the speed of the first member of the first differential gear device is determined through a speed control of the MG1.

5. The transmission of claim 1,
wherein the first differential gear device and the second differential gear device are each formed with a planetary gear system,
the first member, the second member, and the third member of the first differential gear device are formed with a first ring gear, a first carrier, and a first sun gear, respectively, and
the first member, the second member, and the third member of the second differential gear device are formed with a second ring gear, a second carrier, and a second sun gear, respectively.

6. The transmission of claim 1,
wherein the first torque transfer mechanism, the second torque transfer mechanism, and the third torque transfer mechanism are formed with an engine clutch (EC), a first clutch, and a second clutch, respectively configured to connect or intercept members rotating at a relative rotation speed, and
the fourth torque transfer mechanism and the fifth torque transfer mechanism are formed with a first brake and a second brake, respectively, that restrict a rotation of a connected member.

7. A method of controlling starting of a vehicle, comprising:
starting, by a controller, the engine by a starter;
adjusting, by the controller, an input shaft speed of a transmission to a predetermined speed range to engage a coupling element of a torque transfer mechanism; and
determining, by the controller, after the coupling element of the torque transfer mechanism is engaged, the input shaft speed of the transmission according to the engine speed and driving efficiency of at least two motor generators, in response to a request for engine power,
wherein the predetermined speed range is a range between a speed constraint of the engine and speed constraints of the motor generators of the transmission.

8. The method of claim 7, further comprising:
disengaging, by the controller, a coupling element of a torque transfer mechanism and
determining a speed of an input shaft of a transmission according to driving efficiency of at least two motor generators, in response to power of an engine not being requested.

9. The method of claim 7, further comprising:
transferring, by the controller, input information to the transmission and determining whether power of the engine is necessary.

10. The method of claim 9, wherein the input information of the transmission comprises starting request information of the engine, a speed of an output of the transmission, a request torque amount of each constituent element, each temperature of a first motor generator (MG1) and a second motor generator (MG2), a speed of the MG1, a speed of the MG2, a speed of the engine, a state of charge (SOC) of the battery, and information about engagement of an engine clutch.

11. The method of claim 7, further comprising:
shortening, by the controller, a starting response time of the engine by controlling the speed of the input shaft of the transmission adjusted to the predetermined speed range to a speed equal to a maximum speed of the engine.

12. The method of claim 7, further comprising:
determining, by the controller, when the input shaft speed of the transmission is adjusted to the predetermined speed range, whether a coupling element of the torque transfer mechanism is engaged, in response to the engine power being requested.

13. A non-transitory computer readable medium containing program instructions executed by a processor or controller, the computer readable medium comprising:
program instructions that start the engine by the starter;
program instructions that adjust an input shaft speed of a transmission to a predetermined speed range to engage a coupling element of a torque transfer mechanism; and
program instructions that determine after the coupling element of the torque transfer mechanism is engaged, the input shaft speed of the transmission according to the engine speed and driving efficiency of at least two motor generators, in response to a request for engine power,
wherein the predetermined speed range is a range between a speed constraint of the engine and speed constraints of the motor generators of the transmission.

14. The computer readable medium of claim 13, further comprising:
program instructions that disengage a coupling element of a torque transfer mechanism and determining a speed of an input shaft of a transmission according to driving efficiency of at least two motor generators, in response to power of an engine not being requested.

15. The computer readable medium of claim 13, further comprising:
program instructions that transfer input information to the transmission and determining whether power of the engine is necessary.

16. The computer readable medium of claim 13, further comprising:

program instructions that shorten a starting response time of the engine by controlling the speed of the input shaft of the transmission adjusted to the predetermined speed range to a speed equal to a maximum speed of the engine.

17. The computer readable medium of claim 13, further comprising:
program instructions that determine when the input shaft speed of the transmission is adjusted to the predetermined speed range, whether a coupling element of the torque transfer mechanism is engaged, in response to the engine power being requested.

* * * * *